United States Patent [19]

Gehrs et al.

[11] Patent Number: 5,181,165
[45] Date of Patent: Jan. 19, 1993

[54] PANELBOARD WITH INSULATIVE SNAP-IN SUPPORT MEANS

[75] Inventors: Donald F. Gehrs, Brandon; Louis L. Runge, Clinton, both of Miss.

[73] Assignee: Westinghouse Electric Corp., Pittsburgh, Pa.

[21] Appl. No.: 782,188

[22] Filed: Oct. 24, 1991

[51] Int. Cl.⁵ .................................................. H02B 1/20
[52] U.S. Cl. .................................. 361/355; 174/70 B; 361/361
[58] Field of Search ...................... 439/460, 571–574; 174/68.2, 70 B, 71 B, 72 B, 99 B, 149 B; 361/346, 358, 355, 361, 396

[56] References Cited

U.S. PATENT DOCUMENTS

| | | |
|---|---|---|
| 3,371,251 | 2/1968 | Speck . |
| 3,769,553 | 10/1973 | Coley . |
| 3,801,875 | 4/1974 | Morby et al. . |
| 4,004,197 | 1/1977 | Hawkes, Jr. . |
| 4,646,198 | 2/1987 | Rich et al. . |
| 4,667,268 | 5/1987 | Mrowka .............................. 361/355 |
| 4,916,574 | 4/1990 | Hancock et al. . |
| 5,047,604 | 9/1991 | Grass .................................. 200/294 |
| 5,067,043 | 11/1991 | Markowski ......................... 361/361 |
| 5,072,071 | 12/1991 | Cassity ................................ 174/59 |

OTHER PUBLICATIONS

"Ultrasonic Staking", Branson Technical Information Bulletin, PW-6, 1980.

Primary Examiner—Gerald P. Tolin
Attorney, Agent, or Firm—M. J. Moran

[57] ABSTRACT

In an improved panel interior assembly of the type in which elongated bus bars are snap-fit into an insulating support structure a plurality of integrally molded pins are attached to the insulating support structure positioned to extend through holes in a pan to which the insulating support structure is to be attached. These pins are ultrasonically staked to securely hold the insulating support structure and bus bars attached thereto on the pan.

10 Claims, 4 Drawing Sheets

PANELBOARD WITH INSULATIVE SNAP-IN SUPPORT MEANS

BACKGROUND OF THE INVENTION

1. Field of the Invention

This invention relates generally to electric distribution systems and more particularly to an electric panel assembly in which bus bars are attached to a rigid support member which is attached to a supporting pan, both without the use of separate or external fasteners.

2. Description of the Prior Art

Generally, a panel assembly or load center contains several circuit breakers connected to bus bars and serves as distribution centers in main electrical circuits to many branch circuits. Panel assemblies are utilized in both one-phase and three phase insulations wherein bus bars of positive and negative potentials are mounted on a dielectric support structure. Some panel assemblies of prior construction have the disadvantage of including separate fastening means for fastening the bus bars in place on the support structure, whereby additional costs and inconvenience is required in assembling the panel assemblies. Another shortcoming of these prior art panel assemblies is that they also require separate fastening means such as screws or rivets to attach the bus bar and support structure to a support pan.

Cooley in U.S. Pat. No. 3,769,553 discloses a bus bar and support structure which snap together. However, this device must be secured to a supporting pan with screws or other fasteners.

SUMMARY OF THE INVENTION

The present invention utilizes the snap-together bus bar and support structure of the type disclosed by Cooley in U.S. Pat. No. 3,769,553 with an optional snap-in retainer to hold related components in place. Additionally, pins projecting from the support structure extend through holes in the support pan. These pins are then ultrasonically staked to the support pan.

Like Cooley, we prefer to provide an elongated insulating support structure and a pair of elongated bus bars. Each of the bus bars comprises an elongated main body part and a plurality of stab parts extending from the main body part in a spaced relationship spaced lengthwise relative to the main body part. The insulating support structure comprises a plurality of spaced ledge parts at each of two opposite sides thereof. At each of the opposite sides of the insulating support structure all adjacent spaced ledge parts are spaced by a stab-receiving slot. The spaced ledge parts and the stab-receiving slots of the two opposite sides are staggered lengthwise such that each stab-receiving slot at each side of the insulating support structure is opposite a ledge part of the opposite side of the insulating support structure. The pair of bus bars are supported on the opposite sides of the insulating support structure with the spaced stab parts of each bus bar being positioned in the associated slots and with the spaced ledge parts of the associated side of the insulating support structure being positioned over parts of the main body part of the associated bus bar. The stab parts of the pair of bus bars are positioned in an interleaved relationship aligned lengthwise along the insulating support structure. The insulating support structure has integrally molded projections which fit into corresponding holes in bus bars. We also prefer to provide guide ramps near the stab-receiving slots to promote smooth, low resistance assembly and a secure fit without the use of mechanical fasteners. Molded pins extend from below the ledge parts to fit into holes in a support pan. These pins are ultrasonically staked to securely retain the bus supports and bus bars attached thereto. The improved panel assembly is expandable to satisfy a number of circuit capacity requirements from 8 through 42 circuits with the insulating support structure being comprised of one or more identical sinosodial members.

DESCRIPTION OF THE PREFERRED EMBODIMENTS

Figure 1:
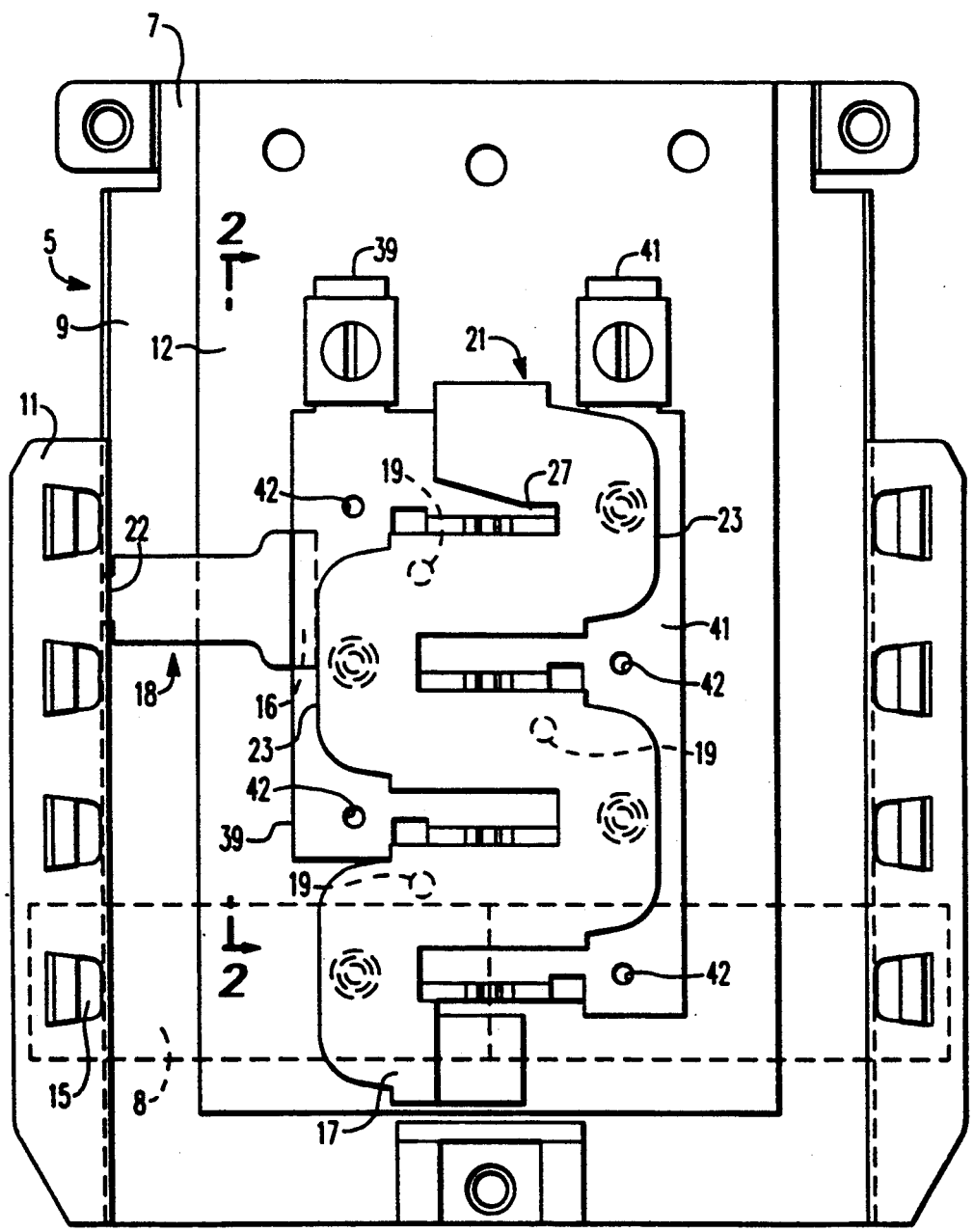
FIG. 1 is a plan view of a panel assembly constructed in accordance with principles of the subject invention.

Referring to the drawings, there is shown, in FIG. 1 a panel assembly 5 comprising a sheet metal support pan 7 that may be supported in a load center or panelboard enclosure in a well known manner. The support pan 7 comprises a lower support part 9 and two upper support shelf parts 11. A plurality of circuit breaker retaining hooks 15 are formed on the shelf parts 11 of the support pan 7.

Figure 2:
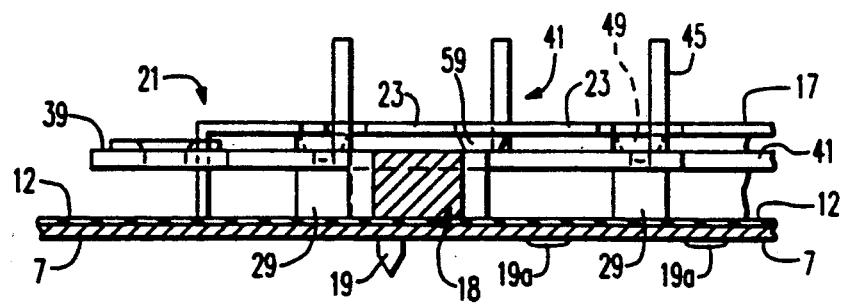
FIG. 2 is a sectional view, taken generally along the line II—II of FIG. 1.

An insulating support structure 17 is secured to the support pan 7 by means of pins 19 that pass through suitable openings in the support pan 7. We also prefer to use a sheet of insulating material 12 between the support pan 7 and insulating support structure 17 with attached bus bars 39 and 41. Ledge portions 23 of insulating support structure 17 extend over bus bars 39 and 41. We also prefer to provide at least one snap in retainer 18 to which terminal bars or other items may be connected. The retainer fits between shelf 11 and a bus bar 39. A square or rectangular tab 22 is provided on the body 14 of retainer 18 which fits into a comparably shaped hole in support pan 7. At an opposite end a tab 16 fits under a portion of bus bar 39. The top and sides of the retainer may have slots or holes into which a terminal bar or other item may fit. Although the retainer may prevent lateral movement of the bus bar 39, it is not intended to hold the bus bar 39 and attached support structure 17 in place. To more permanently attach bus bars and support structure to the pan 7 pins 19 which are ultrasonically staked into retainers 19a (see FIG. 2). Pins 19 are preferably cone pointed for ease of location and insertion into holes in support pan 7. Moreover, we prefer that pins 19 be at least 0.16 inches in diameter and 0.4 inches long. Those dimensions assure that adequate material is present to ultrasonically form retainers 19a of sufficient diameter to be effective. Another advantage is that if staking of a pin is inadvertently omitted, an unstaked pin of at least 0.4 inches will prevent assembly of the interior to a panelboard. This feature insures a level of quality which could not be obtained with the use of mechanical fasteners.

Figure 3:
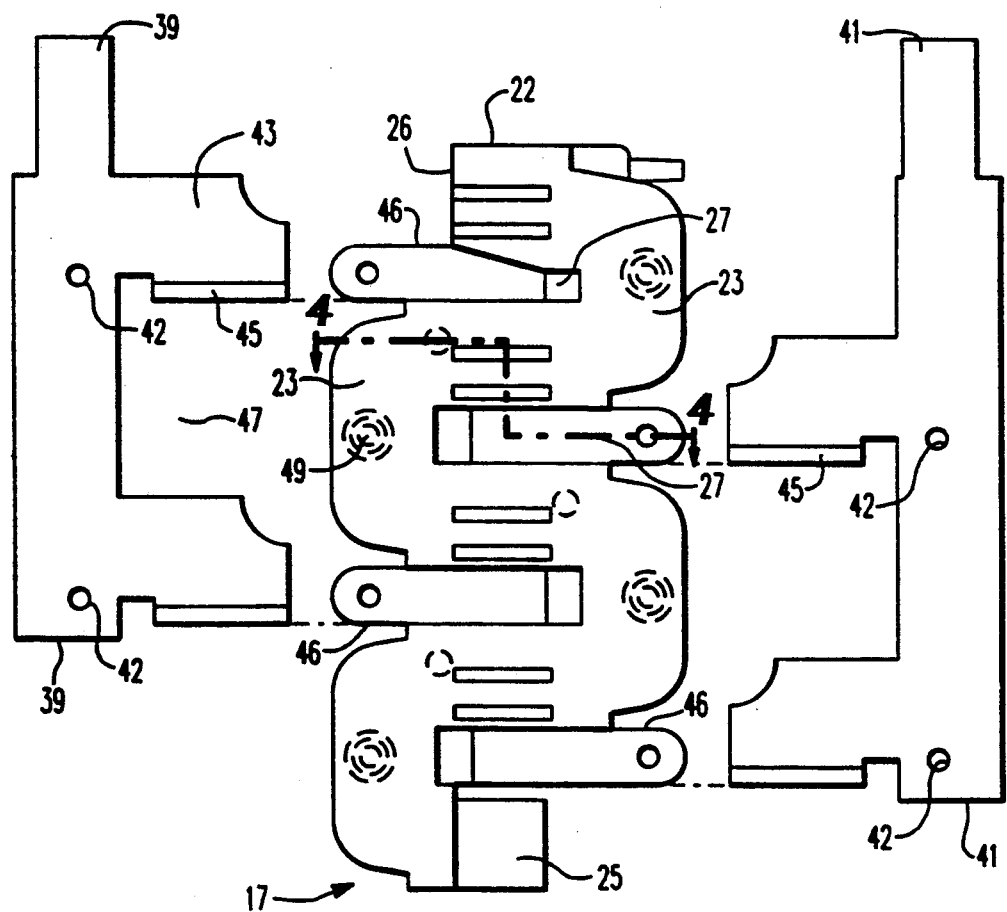
FIG. 3 is an exploded view of a segment of the insulating support structure and associated portion of the bus bars.
Figure 5:
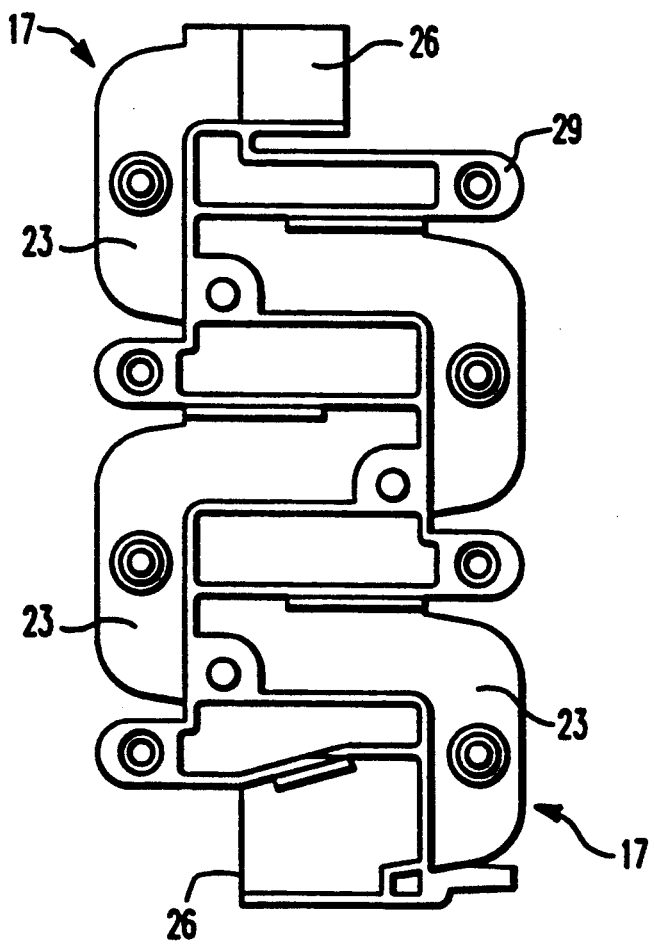
FIG. 5 is a bottom view of the insulating support structure.
Figure 6:
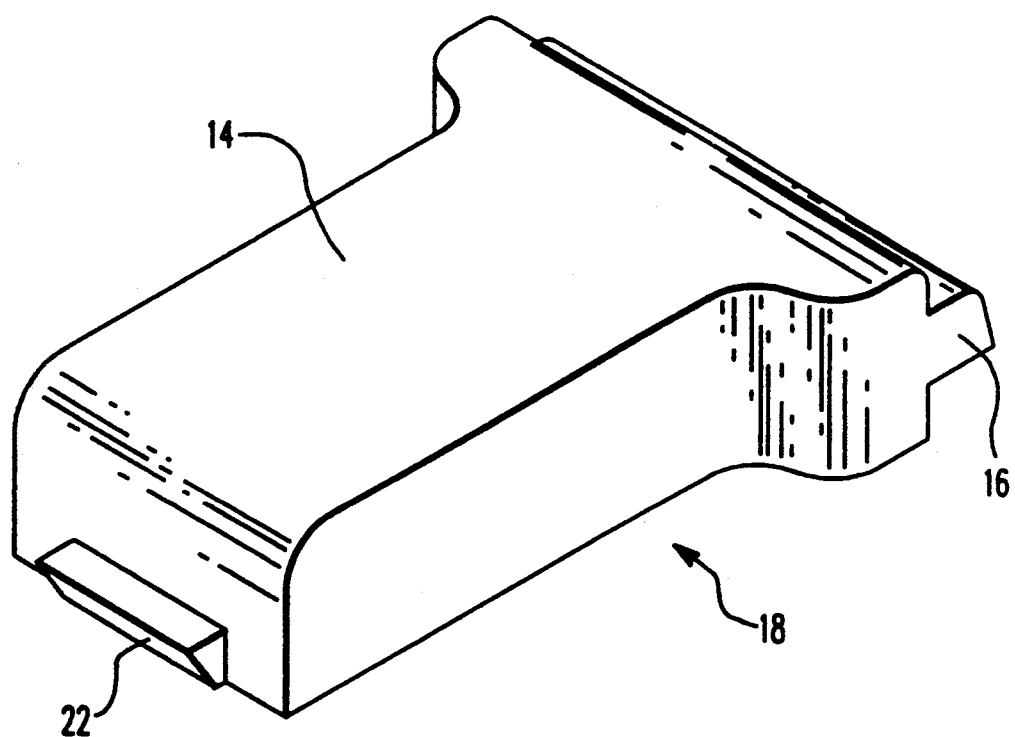
FIG. 6 is a perspective view of a present preferred snap in retainer.

The support structure 17 is an elongated member molded as an integral unit of an electrically insulating material. It comprises a main body support part 21 extending the length of the structure 17 and a plurality of ledge parts 23 extending outward at the front of the support structure 17 at each of two opposite sides of the main body support part 21. A plurality of transversely extending stab-receiving slots 27 (see FIGS. 3 and 5) are formed at each of the two opposite sides of the support structure 17 such that there is a stab-receiving slot 27 between each of adjacent ledge parts 23 at each side of the support structure 17. As can be seen in FIG. 3, the support 17 is constructed with the spaced ledge parts and the stab-receiving slots of the two opposite sides being staggered lengthwise such that each stab-receiving slot at each side of the insulating support structure 17 is opposite a ledge part 23 of the opposite side of the insulating support structure 17. Thus, the support structure has a sinusoid wave-like shape. We further prefer to provide mating lands 25 and 26 at each end of the insulating support structure. This enables us to connect several insulating support structures 17 together to accommodate longer bus bars.

Figure 4:
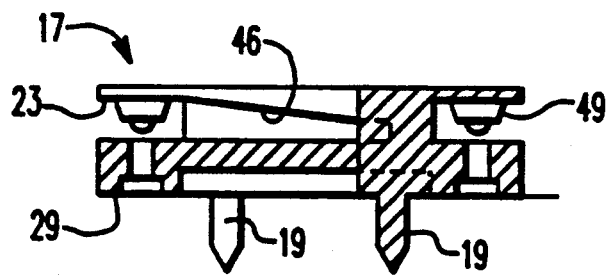
FIG. 4 is a sectional view of the insulating support structure taken generally along the line IV—IV of FIG. 3.

The insulating support structure 17 is molded such that there is a finger portion 29 extending from the supporting main body portion 21 under each of the stab-receiving slots 27. The back surfaces of the finger portions 29 and the back surface of the main body portion 21 are flat surfaces that rest on the pan 7 to support the structure 17. As shown in FIG. 4, we prefer to provide a ramp 46 adjacent to each slot 27. The ramp permits the bus bars 39 and 41 to be slid into the insulating support structure and held firmly in place. The ramps 46 will assert pressure on the top surface of the bus bars 39 and 41 when the bus bars are assembled on the insulating support structure 17.

A pair of bus bars 39 and 41 are supported on the the insulating support structure 17 and are composed of electrically conducting material. Each of the bus bars 39 and 41 (FIG. 3) comprises a flat elongated main body portion 43 and a plurality of flat stabs 45 that are bent over from the main body portion 43 to extend along planes generally normal to the plane of the main body portion 43 in the manner disclosed in FIGS. 2 and 3. Each of the bus bars 39 and 41 is formed with a plurality of spaced apertures 47 between adjacent flat stabs 45.

The insulating support structure 17 is provided with a plurality of projections 49. Each projection 49 is located on the underside of ledge portions 23 of insulating support structure 17 and is aligned with a corresponding opening 42 in the bus bars 39 and 41. When the bus bars are assembled with the insulating support structure 17, each projection 49 snaps into place within its corresponding opening 42.

During the assembly of our interior assembly, the two bus bar structures 39 and 41 are moved from the position in which they are seen in FIG. 3 to the supported or mounted position seen in FIG. 1. During this movement of the bus bars 39, 41, each of the stabs 45 moves into the associated stab-receiving slot 27. In the final positions of the bus bars 39 and 41 the stabs 45 are positioned in an interleaved relationship aligned lengthwise along the center portion of the insulating support structure 17 as seen in FIG. 1. The insulating support structure 17, which is molded as an integral unit from an electrically insulating material with some resiliency, such as a thermosetting resin (for example, a phenolic resin), is then secured to the supporting pan 7 by means of integrally molded pins 19. The bus bars 39 and 41 rest on the flat front surfaces of the finger portions 29. As the bus bars, 39, 41 are moved into position sliding over the front surfaces of the finger portions 29, the ledge portions 23 flex upward. When the bus bars 39, 41 reach the fully mounted position seen in FIGS. 1 and 2, the spring charged ledge portions 23 snap downward with the projections 49 moving into the openings 42 in the bus bars 39, 41 to provide an interlocking engagement between the insulating support structure 17 and the bus bars 39, 41 to thereby retain the bus bars in the mounted position without the need of screws or other types of separate fastening members. The assembly is then placed on the support pan 7 and insulating sheet 12 so that pins 19 pass thorugh holes in the sheet 12 and pan 7. Then the pins 19 are subjected to ultrasonic staking which causes the pins to be formed into retainers 19a. Those retainers will have a diameter greater than the holes thus holding the bus bar and support assembly in place. The finished interior can then be mounted in a panel or load center in the conventional way. However, should any pin 19 not have been staked the unstaked pin 19 will prevent proper mounting of the interior.

When the panel assembly is installed a plurality of circuit breakers 8 are mounted on the assembly and connected to the conducting stabs 45 in a well known manner. During the mounting operation, the load end of the circuit breaker is first moved into position with the associated hook portion 15, and thereafter the circuit breaker is pivoted down into the fully mounted position shown by dotted lines in FIG. 1. Each of the circuit breakers 8 is provided with a well known type of solderless terminal connector at the load end thereof to permit connection of the circuit breaker in an electric circuit. Only two circuit breakers are disclosed in FIG. 1, it being understood that at an installation a separate pair of circuit breakers 8 may be connected to each of the conducting stabs 45. Thus, each of the conducting stabs 45 electrically feeds two circuit breakers in the panel assembly. The bus bars 39, 41, when connected in an electric circuit, are of opposite polarity, and it is necessary to provide adequate insulation and spacing between the bus bars in accordance with electrical standards. It can be seen, with reference to FIG. 1, that each of the ledge parts 23, at each side of the insulating support structure 17, is opposite a stab receiving slot 27 of the opposite side of the insulating support structure 17 so that each of the stabs 45 is insulated from the main body portion of the opposite bus bar with the ledge part adjacent the stab 45 covering part of the main body portion of the opposite bus bar. The insulating support structure 17 and bus bars 39, 41 are so constructed and arranged that the bus bars, which are of opposite polarity, are adequately spaced and insulated from each other.

The panel assembly illustrated in FIGS. 1 and 3 is an 8-circuit assembly. Two full size circuit breakers 8 or four half size circuit breakers (not shown) are connected to each of the four stabs 45. A total of eight full size circuit breakers can be mounted on the assembly to feed and control eight circuits drawn off of the two bus bars. Alternatively, sixteen half size circuit breakers could be used to feed sixteen circuits. Single phase and three phase panel assemblies of the type herein described are generally offered in different circuit denominations. Manufacturers may supply panel assemblies comprising 8, 12, 16, 20, 24, 28, 32, 36, 40 or 42 circuit breakers.

Although we have disclosed certain present preferred embodiments of our improved panel, it is to be understood that various changes in the structural details and arrangement of parts thereof may be made without departing from some of the essential features of the invention.

We claim:

1. An improved panel interior assembly of the type comprising a pan, an elongated insulating support structure mounted on the pan and a pair of elongated bus bars, each bus bar comprising an elongated body portion and a plurality of stabs extending from the body portion in a longitudinally spaced relationship, the body portion having opening means therein, the insulating support structure comprising a body portion having a plurality of longitudinally spaced ledge parts at each of two opposite sides thereof, a plurality of transversely extending longitudinally spaced fingers extending from each side of the body portion of the insulating support structure, at each of said two opposite sides of said insulating support structure all adjacent spaced ledges being spaced by a stab-receiving slot, said ledge parts and said stab-receiving slots of said two opposite sides being staggered lengthwise such that each stab-receiving slot at each side of said insulating support structure is opposite a ledge part of the opposite side of said insulating support structure, said pair of bus bars being supported on said opposite sides of said insulating support structure with the spaced stabs of each bus bar being positioned in the associated slots and with the spaced ledge parts of the associated side being positioned over parts of the associated bus bars, said stabs of said pair of bus bars being positioned in an interleaved relationship aligned lengthwise along said insulating support structure, each of said bus bars being supported by the ledge parts and resting on the associated fingers and projection means on top of said ledge parts cooperating with the opening means on said body portions of said bus bars to retain said bus bars in the mounted position on said insulating support structure wherein the improvement comprises a plurality of integrally molded pins attached to said insulating support structure extending through holes in a pan to which the insulating support structure is attached and an ultrasonically staked head formed on at least one pin after the pin has been inserted into a hole.

2. The panel of claim 1 also comprising at least one ramp attached to the support structure adjacent a stab receiving slot and being sized to secure a bus bar to the support structure.

3. The improved panel assembly of claim 2 wherein there is one ramp adjacent each stab receiving slot.

4. The panel assembly according to claim 2 said finger portion being under each said slot and having a supporting surface means comprising the front surfaces of said finger, the thickness of the main body portion of each bus bar being a dimension greater than a dimension between an outer end of the associated ramp and the associated support-surface means.

5. The panel assembly according to claim 4, said ledge parts having second support surfaces on the side of the bus bars opposite that of said support-surfaces of said finger portions, and said second support surfaces having projections engageable with the bus bars.

6. The panel assembly according to claim 1, each of said fingers being under an associated stab receiving slot to provide a support surface under each of said stabs.

7. The improved panel assembly of claim 1 also comprising a support pan to which the support structure is attached.

8. The improved panel assembly of claim 4 wherein the pan has a perimeter slot also comprising a snap-in retainer positioned adjacent to a portion of a bus bar and having a first tab fitted within said perimeter slot and second tab which fits underneath the bus bar.

9. The panel assembly according to claim 1, said projection means and said opening means comprising cooperating interengaging snap-in parts retaining said bus bars in a mounted position on said insulating support structure.

10. The improved panel interior assembly of claim 1 wherein an ultrasonically staked head is formed on all pins.

* * * * *